June 25, 1968 G. INGRAM 3,390,056
PORTABLE WATER DISTILLATION APPARATUS
Filed March 25, 1966 3 Sheets-Sheet 1

INVENTOR
George Ingram
BY
Watson, Cole, Grindle + Watson
ATTORNEYS

United States Patent Office 3,390,056
Patented June 25, 1968

3,390,056
PORTABLE WATER DISTILLATION APPARATUS
George Ingram, 902 Hawkins House, Dolphin Square, London, England
Filed Mar. 25, 1966, Ser. No. 537,378
Claims priority, application Great Britain, Mar. 26, 1965, 12,852/65
7 Claims. (Cl. 202—83)

ABSTRACT OF THE DISCLOSURE

The still comprises a collapsible sphere whose upper hemisphere is transparent and lenticulated. The lower hemisphere is lined with water absorbent material with an absorbent projection dipping into the sea on which it floats supported by a buoyancy ring. A condenser and water reservoir are supported within the sphere.

This invention relates to portable water distillation apparatus. It is particularly applicable to the distillation of drinking water from sea water or non-potable water, hereinafter indicated in the general term "salt water" using solar heat. Being portable, the present invention is particularly suitable for inclusion in emergency equipment especially equipment for use at sea.

In known types of solar heat operated distillation apparatus the apparatus comprises an outer transparent waterproof shell which can be distended by inflation. This shell contains an absorbent fabric bag or its equivalent supported in spaced relation to the shell, a salt water feed pocket being provided at the top of the shell and coupled with a trickle feed nozzle for delivering salt water on to the exterior surface of the bag. A distilled water collection chamber is provided at the bottom of the shell and communicates with the space between the shell and the bag.

In operation, when the shell has been distended the bag is soaked with salt water by way of the feed nozzle and the sun's rays, which pass through the outer transparent shell, evaporates water from the soaked bag, which vapour condenses on contact with the inner surface of the shell. This distilled water condensate trickles down the inside of the shell and into the distilled water collection chamber.

It has been found that in use this known type of apparatus sometimes fails to function adequately as emergency equipment. This may occur if the shell is punctured and thus unable to be inflated; the absorbent fabric bag comes into contact with the inside of the shell and thereby contaminates the distilled water with salt water; or the trickle feed becomes clogged. Also, as is sometimes the case in emergencies, the user does not have the capacity to recharge the salt water feed pocket.

The present invention seeks to obviate or reduce some or all of these disadvantages by providing a portable water distillation apparatus which once assembled will function relatively automatically and which does not have to be inflated before use.

According to the invention there is provided a portable water distillation apparatus comprising a self-supporting hollow shell adapted to be readily collapsible, the upper part of the shell being permeable by heating radiation from the sun, means at the bottom of the shell for providing salt water inlet, a condensation member in the upper portion of the shell and a distilled water reservoir beneath the condensation member, the arrangement being such that water vapour produced from the salt water entering the shell from the inlet by the sun's rays passing through the shell rises into contact with the condensation member which is so formed as to guide the condensed distilled water into the distilled water reservoir.

Preferably the salt water inlet is in the form of an absorbent sponge or like core projecting from the bottom of the shell. The lower part of the shell is preferably lined with absorbent sponge or like laminate which is in communication with the sponge core. The condensation member may be in the form of a downwardly pointing cone with the distilled water reservoir suspended beneath the point of the cone.

The invention will now be described in greater detail by way of example with reference to the accompanying drawings, in which.

Figure 1:
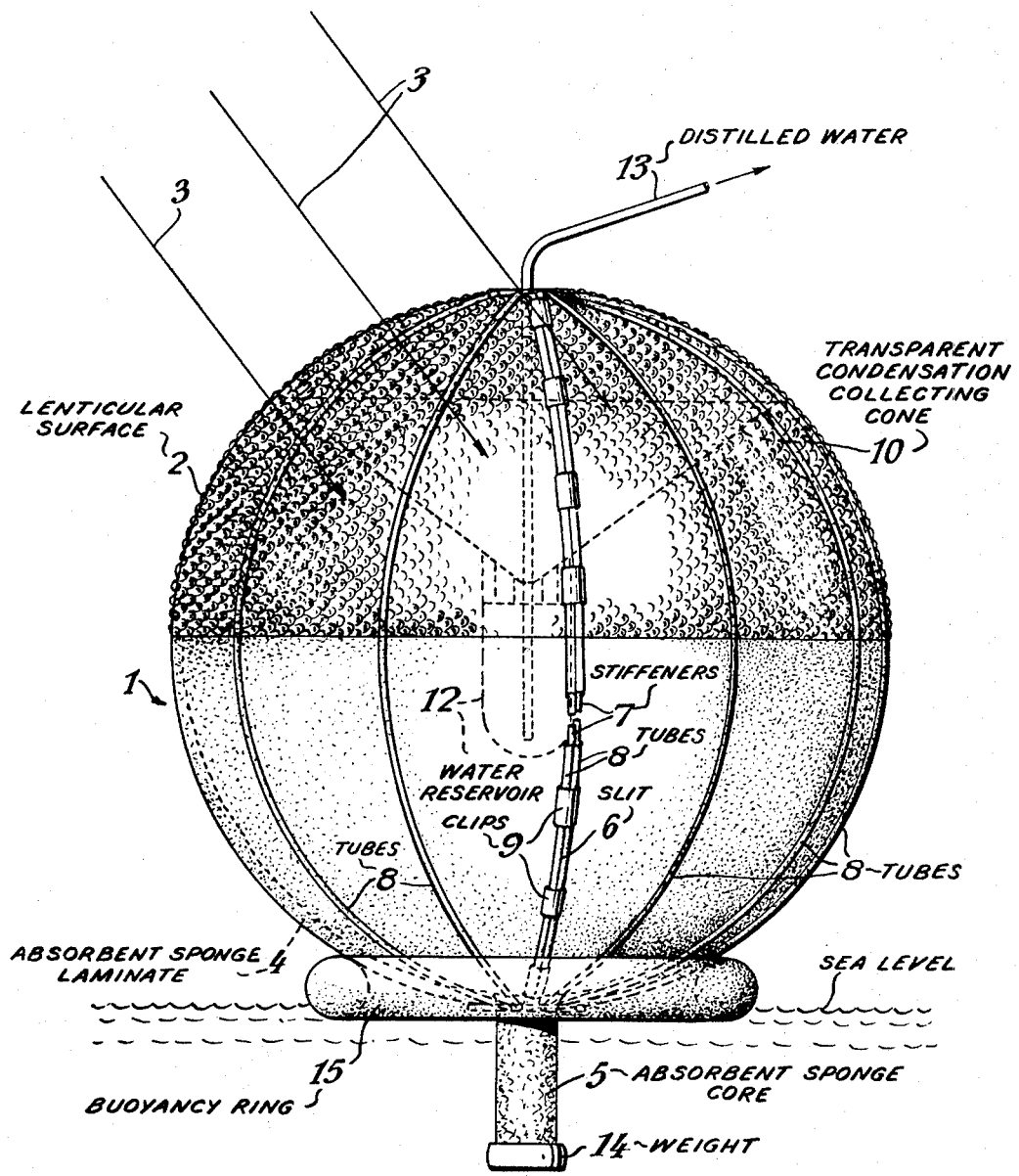
FIGURE 1 is a view of a distillation apparatus in accordance with the invention in its assembled condition.
Figure 2:
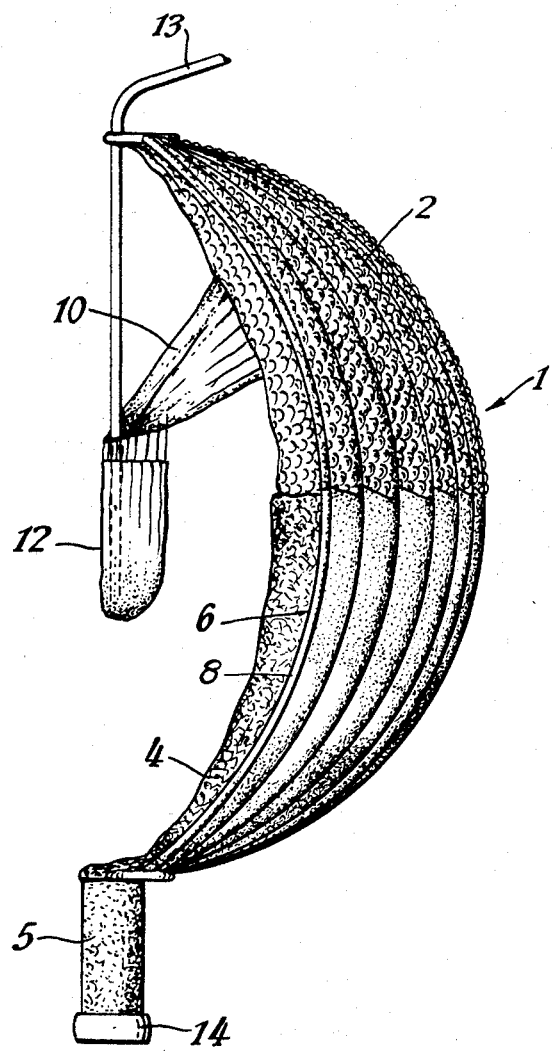
FIGURE 2 is a view of the distillation apparatus of FIGURE 1 in its collapsed condition.
Figure 3:
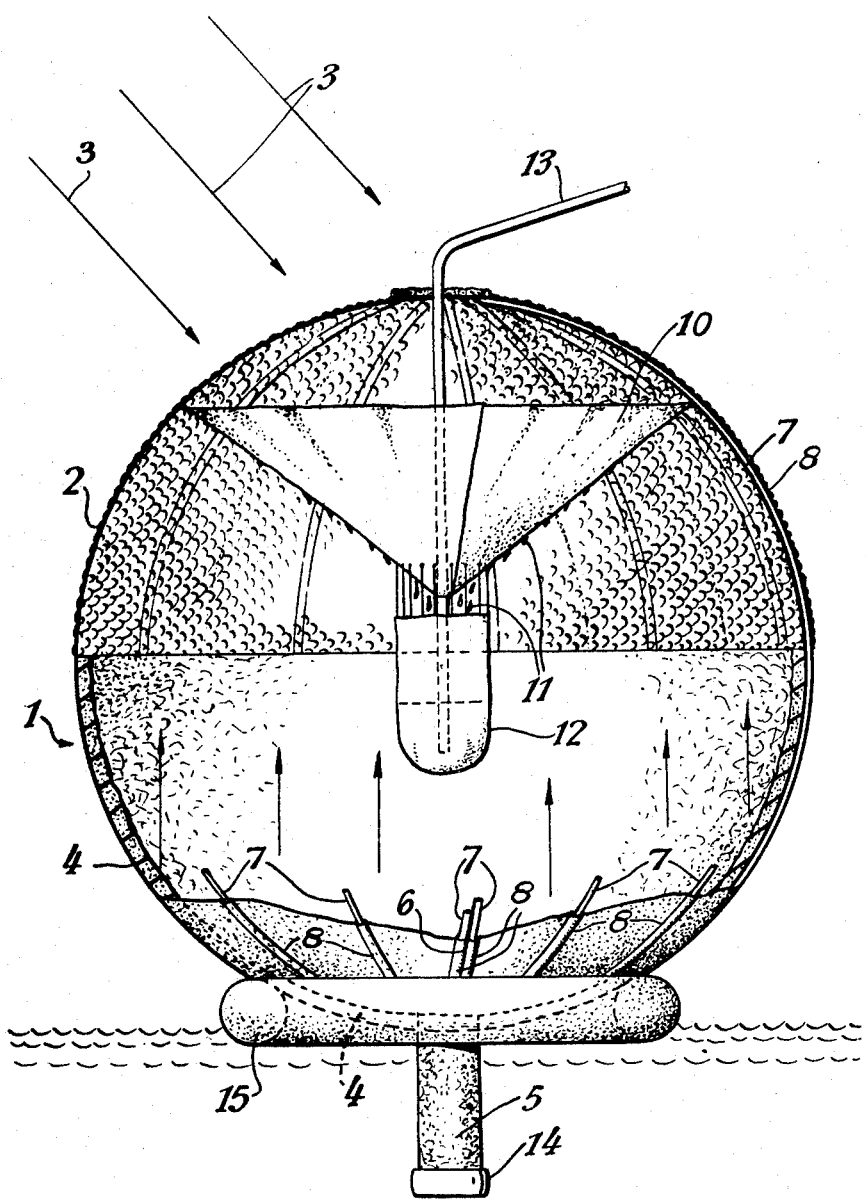
FIGURE 3 is a sectional view through the apparatus as shown in FIGURE 1 in its operative position.

Referring to the drawings a portable water distillation apparatus comprises a hollow spherical shell 1 having an upper portion 2 which is transparent to the sun's rays (which are indicated at 3) and has a lenticular surface. The lower portion of the shell is provided with an absorbent sponge laminate 4 communicating with an absorbent sponge core 5 depending from the bottom of the shell. The shell is constructed with a slit 6 in its periphery extending from the top to the bottom of the shell. This slit enables the shell to be collapsed into a segmental shape by judicious folding of the material of the shell. FIGURE 1 shows the apparatus with the shell in its operative position while FIGURE 2 shows the shell in its collapsted folded position. As can be seen the collapsing of the shell takes place in a fashion well known in "Chinese Lanterns."

The shell is provided with a plurality of semi-circular stiffening members 7 which are encased in tubes 8 provided on the outside of the shell. These tubes may be open at their upper end so as to allow the stiffening members 7 to be inserted either before unfolding the shell from the collapsed position or after the shell has been unfolded. In the operative position of the shell the two edges of the slit 6 are connected together by means of clips 9 which may as shown connect together two of the stiffening tubes 8 and where a water-tight seal is required, the slit may be covered with a water-tight adhesive tape.

Inside the upper portion of the shell 1 is a transparent condensation cone 10 which is downwardly pointed so that condensate forming on the surface of the cone such as is indicated at 11 will run toward the point and thence into a distilled water reservoir 12 suspended beneath the point of the cone 10.

A tube 13 connects the interior of the reservoir 12 with the exterior of the shell to enable the distilled water collected therein to be removed. Where desired, water can be drunk directly from the tube 13.

The absorbent sponge core is provided with a weight 14 at the lower end thereof so as to stabilise the apparatus when floating in the water.

Where additional buoyancy is concerned, a buoyancy ring 15 may be positioned around the appropriate part of the shell.

As will be clearly seen from FIGURE 2 both the cone 10 and the reservoir 12 may be foldable with the shell, although in the case of the reservoir it may be desirable to make this non-foldable so as to assist in retaining it watertight.

The operation of the apparatus will now be described:

The portable water distillation apparatus as above described is normally supplied in the folded condition as shown in FIGURE 2 in order that it may take up a space which is as small as possible as is necessary with emergency equipment. The stiffening members 7 are usually provided separately which will allow still further folding of the apparatus.

With the apparatus in the form shown in FIGURE 2 the stiffening members 7 are inserted in the tubes 8 and the two edges (of the slit 6) of the shell are pulled out together so as to form the spherical shape. The edges of the shell are then clipped together as previously indicated and the apparatus is ready for use. Where extra buoyancy is required a buoyancy ring should be attached to the shell and to ensure water-tightness of the shell an adhesive water-impermeable tape may be secured over the slit 6.

The apparatus is then placed in the salt water to be distilled, which of course will normally be sea water. The salt water will enter the apparatus by way of the absorbent sponge core, the shell being retained in its properly orientated position by the weight 14.

The water entering the apparatus will rise up the absorbent sponge laminate by capillary or like action. The laminate will be heated by the sun's rays passing through the transparent upper portion of the shell and through the conical condensation member 10 and the water in the laminate will be caused to vaporise and will rise away from the laminate. When the water vapour meets the condensation member 10 it will condense into droplets as shown at 11 which will run down the cone towards the point thereof whereupon it will drip into the distilled water reservoir 12. This water in the reservoir 12 can then be withdrawn via the tube 13.

Should water vapour pass the edges of the cone and condense into the inside of the cone this distilled water may be allowed to pass into the reservoir by providing apertures in the apex of the cone (not shown).

It will be understood that various modifications may be made to the above described apparatus without departing from the scope of the invention. For example the hollow shell may be of any desired shape such as oval, hexagonal, polygonal. The reservoir may be positioned in other positions within the shell in which case the condensation member would be appropriately shaped to guide the condensed distilled water into the reservoir. The condensation member may be provided with channels to assist in the guidance of water. If desired, the normal form of condensation cone as shown could be replaced by a network of absorbent strips patterned after the style of membranes of a leaf and so placed as to capture and funnel the distillate into the reservoir. If desired, more than one reservoir may be provided each having its own water extraction tube. Allow where desired additional buoyancy means could be provided permanently attached to the shell and these could be in the form of individual floats, thus permitting the shell to collapse as described. Instead of the upper portion of the shell being transparent, it could, if desired, be translucent or even opaque to normal light but provide the necessary heat transmission.

In a further modification, the shell may be constructed without the slit 6, the erection of the apparatus being achieved by the insertion of the stiffening members 7. In its collapsed form the apparatus may be folded as desired, the members 7 being removed and kept separately.

It will be seen that the above described apparatus is readily portable, easily erected and does not depend upon air pressure for its support. Once assembled and placed in salt water, providing that the sun's rays can reach it, the operation of the apparatus is automatic. Thus the apparatus will function even if punctured and there is no possible contact between the salt water and the distillate. Because no triple feed is used the feed cannot become clogged and because of the automatic operation of the apparatus once it has been set up it requires no attention.

I claim:

1. A portable water distillation apparatus comprising a self-supporting hollow shell adapted to be readily collapsible, the upper part of said shell being permeable by heating radiation from the sun, means, comprising an absorbent sponge core projecting at the bottom of said shell for providing salt water inlet, a transparent condensation member in the upper portion of said shell and a distilled water reservoir beneath said condensation member, the lower part of the shell being lined with absorbent sponge which is in communication with said absorbent sponge core, the arrangement being such that water vapor produced from the salt water entering said shell from the inlet by the sun's rays passing through said shell rises into contact with said condensation member which is so formed as to guide the condensed distilled water into said distilled water reservoir.

2. Apparatus as claimed in claim 1, wherein the condensation member is in the form of a downwardly pointing cone, the distilled water reservoir being suspended beneath the point of the cone.

3. Apparatus as claimed in claim 1 wherein the upper portion of the shell is embossed with the lens elements to concentrate the sun's rays.

4. Apparatus as claimed in claim 1, wherein the lower portion of the shell is weighted so as to ensure correct orientation of the shell in water.

5. Apparatus as claimed in claim 1, wherein the shell is split longitudinally so that it can be folded flat in the manner of "Chinese Lanterns."

6. Apparatus as claimed in claim 1, wherein a drinking tube is provided, one end of the tube extending into the distilled water reservoir and the other end of the tube extending from the exterior of the upper portion of the shell.

7. Apparatus as claimed in claim 6, wherein buoyancy means are provided to assist in floating the shell on the water surface.

References Cited

UNITED STATES PATENTS

| 2,412,466 | 12/1946 | Miller | 202—234 |
| 2,455,834 | 12/1948 | Ushakoff | 202—234 |
| 2,455,835 | 12/1948 | Ushakoff | 202—234 |
| 2,820,744 | 1/1958 | Lighter | 202—234 |

NORMAN YUDKOFF, *Primary Examiner.*

F. SOFER, *Assistant Examiner.*